Nov. 15, 1949          W. E. HAPPEL          2,488,401
                        CONTROL SYSTEM
                     Filed Dec. 12, 1945
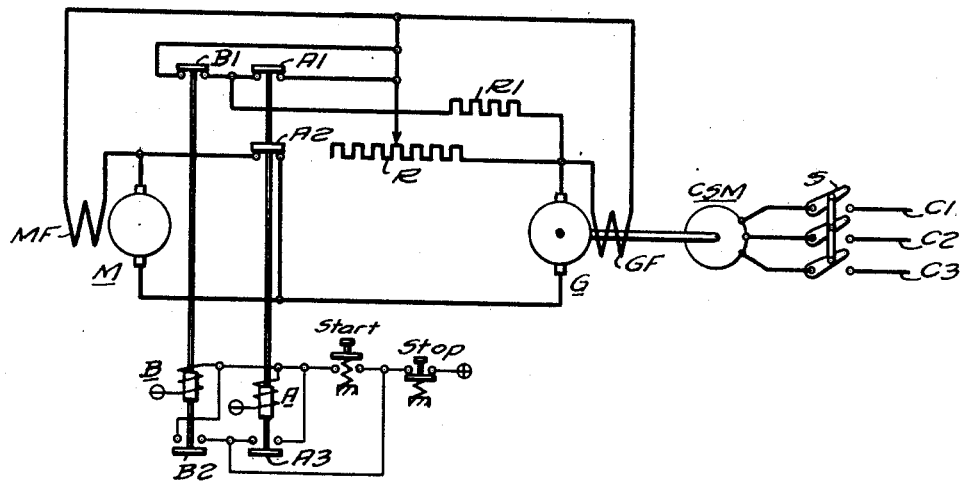
WITNESSES:                              INVENTOR
                                     William E. Happel.
                                         BY
                                       ATTORNEY Patented Nov. 15, 1949

2,488,401

UNITED STATES PATENT OFFICE 2,488,401

CONTROL SYSTEM

William E. Happel, Waynesboro, Pa., assignor to Landis Tool Company, Waynesboro, Pa., a corporation of Pennsylvania Application December 12, 1945, Serial No. 634,544

5 Claims. (Cl. 318—140)

1

This invention relates generally to series variable voltage drives and more particularly to a series variable voltage motor and generator drive in which the motor and generator are each of the series wound type and are of substantially equal rating.

In certain of its aspects, this invention is related to the copending applications of William E. Happel, the inventor in this application, Serial Nos. 634,545 and 634,546, both filed on the same date as this application and entitled Control system, each application being assigned to the same assignee as this invention.

As a general rule, series variable voltage drives are characterized by a marked slowness in build-up of the series generator output at low-fluid strength and poor dynamic braking characteristics at low-motor speed. Measurable improvements in these respects can be realized in part by proper excitation control of the motor series field during dynamic braking and in part through proper control of the series generator output to maintain an active magnetic circuit in the generator during periods when the motor is stopped. This invention utilizes these basic principles to obtain the desired operating characteristics of the system.

One object of this invention is to provide a variable voltage drive embodying a series connected series motor and series generator having effective dynamic braking over the entire speed range of the motor and particularly at low motor speeds.

Another and equally important object of this invention is to provide a series variable voltage drive of the type mentioned in which quick motor starting particularly at low-motor speeds is obtained.

Yet another object of this invention is to provide a series connected series motor and series generator system which combines the characteristics of quick motor starting and effective dynamic braking of the motor.

The foregoing objects are merely illustrative of the various aims and objects of this invention. Other objects and advantages will become apparent upon a study of the following specification when considered in conjunction with the accompanying drawing, in which the single figure thereof illustrates a variable voltage series motor and series generator system embodying the principles of this invention.

In the figure, M designates a series motor and G designates a series generator. The two dynamoelectric machines are usually, although not necessarily, of the same frame size and thus have comparable ratings. Each machine is provided with a series field winding, that for the motor being designated MF and that for the generator being designated GF. The machines are connected in a series loop circuit. Generator G is driven by a suitable constant speed motor CSM which, by way of illustration but not limitation, may be an induction motor adapted for connection to the alternating-current supply conductors C1, C2 and C3 through the switch S.

In order to simplify the illustration of this invention the usual control and protective devices normally incorporated in a system of the type disclosed have been eliminated. It is to be understood, however, that devices of the character mentioned may be incorporated in the system of this invention without departing from the spirit and scope thereof.

In keeping with the foregoing, there is illustrated a simple arrangement including the rheostat R for controlling the field strength of the generator and, hence, controlling the generator output. This rheostat is located in a circuit which shunts the generator series field GF. The rheostat R carries a portion of the generator load current and thus has a voltage drop thereacross in dependence of the load current. Movement of the adjustable tap to insert more of rheostat R into the shunt circuit increases the voltage drop thereacross and increases the generator series field excitation, while movement of the tap in the opposite direction to decrease the shunt circuit resistance weakens the generator series field.

The dynamic braking and quick starting features of this invention are incorporated in the control including the relays A and B. The coils of these relays are connected in parallel in a circuit including the "Start" and "Stop" push buttons, connected between the positive and negative terminals indicated. While two relays have been illustrated, it will be apparent that the entire control function is obtained by means of relay A, relay B merely providing certain safety measures which will hereinafter become apparent.

Relay A includes the contacts A1 which connect the resistor R1 in a circuit paralleling both the rheostat R and the generator series field GF, the contacts A2, which shunt the motor armature winding from the generator load circuit, and the contacts A3, which establish a holding circuit for the coil thereof which is independent of the Start push button.

Relay B includes the contact B1 which par-

-allels contact A1 and thus assures the closure of the circuit including the resistor R1 thereby obviating failure of the series field shunt circuit when the motor armature is shunted and the generator, in effect, short-circuited at contacts A2. Contacts B2 are holding contacts for the coil of relay B and function in the same capacity as contacts A3 of relay A.

Assuming switch S is closed and the generator G is up to normal speed, operation of the system is effected by pressing the Start push button. This energizes relays A and B, opening contacts A1, A2 and B1 and closing contacts A3 and B2. Contacts A3 and B2 maintain the energizing circuits for the coils of the respective relays when the "Start" push button is released. When contacts A1, A2 and B1 open, the motor and generator are connected in the conventional series loop and the motor speed may be controlled by suitable adjustment of the rheostat R.

When the Stop push button is pressed, relays A and B assume the position indicated in the drawing in which contacts A1, A2 and B1 are closed. Since resistor R1 is of fairly low resistance for the instant application, a low-resistance shunt path is thus formed around the generator series field, the total shunt resistance depending upon the setting of the rheostat R at the time the Stop push button is pressed. Thus a controlled portion of the generator load current circulates through the shunt network including rheostat R and resistor R1 and the excitation of the generator field and, hence, the generator output during stopping of the motor is controlled. Contacts A2 short-circuit the motor armature winding from the generator load circuit and thus in effect short-circuit the generator. The motor series field winding, however, remains in the generator load circuit. Its excitation is maintained, in part, due to the inductance thereof which delays its collapse and, in part, due to the generator current circulated therethrough. The reaction of the opposed magnetic forces in the motor, caused by the comparatively strong motor field flux and the armature flux produced by the regenerative armature current circulating in the loop including the contacts A2, produces a strong dynamic braking force on the motor which rapidly brings the motor to rest.

The control arrangement also provides quick starting of the motor. This follows from the short-circuit load on the generator effected at contacts A2 and the regulation of the generator afforded by the shunt circuit including resistor R1 inserted by contacts A2. The generator output voltage circulates a controlled current through the generator load circuit set up at contacts A2 thereby maintaining an active magnetic circuit in the generator even when the motor is stopped. It is, therefore, unnecessary to wait for the generator to build up an active magnetic circuit when starting the motor. Another characteristic tending to speed up starting results from the fact that a controlled exciting current from the generator is flowing in the motor series field when the motor is at rest.

The shunt path around the generator series field set up upon closure of the contacts A1 and safety contacts B1 prevents excessive build-up of the generator series field when the motor is stopped. Thus generator overload during periods when the motor is stopped is obviated.

The foregoing disclosure and the showing made in the drawing are merely illustrative of the principles of this invention and are not to be considered in a limiting sense. The only limitations are to be determined from the scope of the appended claims.

I claim as my invention:

1. An electrical system comprising, in combination, a motor having an armature winding and a series field winding, a generator having an armature winding and a series field winding, circuit means connecting said motor and generator in series circuit relation, means for controlling the excitation of the generator series field winding, contact means for shunting the motor armature from the generator load circuit, resistor means, contact means connecting said resistor means in shunt circuit relation with the generator series field winding, and means for actuating said contact means to open position to start said motor and to closed position to stop said motor.

2. An electrical system comprising, in combination, a motor having an armature winding and a series field winding, a generator having an armature winding and a series field winding, circuit means connecting said motor and generator in series circuit relation, first resistor means disposed in shunt circuit relation with the generator series field winding for controlling the excitation thereof, contact means connected across the motor armature winding which when closed shunt the motor armature winding from the generator load circuit and complete a circuit with the generator armature winding including the generator and motor field windings in series therein, second resistor means, contact means in series with said resistor means, circuit means connecting the series connected contact means and resistor means across the series field winding of the generator, and means for actuating all of said contact means to open position for starting said motor and to closed position for stopping said motor.

3. A control system for a series connected motor and generator, the motor having an armature winding and a series field winding and the generator having an armature winding and series field winding, comprising, in combination, contact means connected across the motor armature winding which when closed shunt the motor armature winding from the generator load circuit and complete a loop circuit with the generator armature winding including the series field winding of the generator and the series field winding of the motor, resistance means shunting the series field winding of the generator, contact means, a resistor connected in series with said contact means, circuit means connecting the series connected contact means and resistor across the series field winding of the generator and means for actuating all of said contact means to open position to start said motor and to closed position to stop said motor.

4. An electrical system comprising, in combination, a motor having an armature winding and a series field winding, a generator having an armature winding and a series field winding, circuit means connecting said motor and generator in series circuit relation, a rheostat connected in parallel with the generator series field winding, contact means for shunting the motor armature winding from the generator load circuit, resistor means, additional contact means operable with said first mentioned contact means for connecting said resistor means in parallel circuit relation with the generator series field winding, whereby to cause a small current to pass through said generator field when said generator and said motor are disconnected.

5. An electrical system comprising, in combination, a motor having an armature winding and a series field winding, a generator having an armature winding and a series field winding, circuit means connecting said motor and generator in series circuit relation, contact means connected across the terminals of the motor armature winding which when closed shunt the motor armature winding from the generator load circuit and complete a loop circuit with the generator armature winding including the generator series field winding and the motor series field winding, and current control means shunting the generator series field winding for causing partial excitation of the generator series field while the motor is cut off from the generator.

WILLIAM E. HAPPEL.

REFERENCES CITED

The following references are of record in the file of this patent:

UNITED STATES PATENTS

| Number | Name | Date |
| --- | --- | --- |
| 1,905,808 | Couwenhoven | Apr. 25, 1933 |
| 2,154,279 | Muller | Apr. 11, 1939 |
| 2,298,735 | Gary | Oct. 13, 1942 |
| 2,379,149 | Harding et al. | June 26, 1945 |
| 2,379,150 | Harding et al. | June 26, 1945 |